United States Patent [19]

Freedman

[11] 3,732,505

[45] May 8, 1973

[54] END PUMP DEVICE FOR A LASER

[75] Inventor: Paul M. Freedman, Las Vegas, Nev.

[73] Assignee: The United States of America as represented by the Secretary of the Air Force, Washington, D.C.

[22] Filed: June 7, 1972

[21] Appl. No.: 260,566

[52] U.S. Cl. ....................331/94.5, 330/4.3

[51] Int. Cl. ....................H01s 3/09

[58] Field of Search ....................331/94.5; 330/4.3

[56] References Cited

UNITED STATES PATENTS 3,297,958 1/1967 Weiner....................331/94.5

3,624,545 11/1971 Ross....................331/94.5

3,663,893 5/1972 Ostermayer, Jr....................331/94.5

*Primary Examiner*—William L. Sikes

*Attorney*—Harry A. Herbert, Jr. et al.

[57] ABSTRACT

A light emitting diode system for pumping a solar pumped laser, having a housing attached to the light concentrating cone of the solar pumped laser with a removable light reflecting cone for directing light from light emitting diodes into the light concentrating cone. A plurality of light emitting diodes are positioned around the light reflecting cone with a filter element being positioned between the diodes and the reflecting cone.

2 Claims, 3 Drawing Figures

PATENTED MAY 8 1973

3,732,505

END PUMP DEVICE FOR A LASER

BACKGROUND OF THE INVENTION

A solar end pumped laser is described in the "Final Technical Report", AFAL–TR–71–315, available at DDC number AD–737787. The system described in this report uses side pumping of the laser rod with a lamp or diode array during solar eclipse portions of the satellite orbit. However, the side pumping of the laser is energy limited because of space limitations since the cooling system for the laser must also be located around the laser rod.

BRIEF SUMMARY OF THE INVENTION

According to this invention, a system for end pumping the laser with either solar energy or energy from light emitting diodes is provided. The light emitting diodes are located around the inner wall of a housing with a diameter that is much greater than the larger diameter of the light concentrating cone for the solar end pumped laser. A removable conical reflector directs the light from diodes into the light concentrating cone for the laser. A filter element, for removing undesired wave lengths of light, is positioned between the light emitting diodes and the conical reflector. Cooling means for the diodes surrounds the outer surface of the housing.

DETAILED DESCRIPTION OF THE INVENTION

Figure 1:
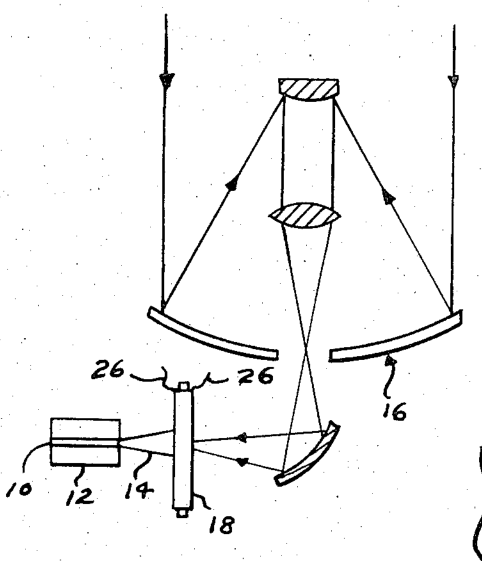
FIG. 1 is a schematic diagram of a sum pumping system for a laser modified according to this invention.

Reference is now made to FIG. 1 of the drawing which shows a conventional laser rod 10 surrounded by a heat sink 12 with a light concentrating cone 14. A solar collection optical system, shown at 16, directs solar energy into the light concentrating cone 14 in the manner described in the Technical Report AFAL–TR–1–315. According to this invention, a light emitting diode pumping attachment 18 is secured to the end of the light concentrating cone 14.

Figure 2:
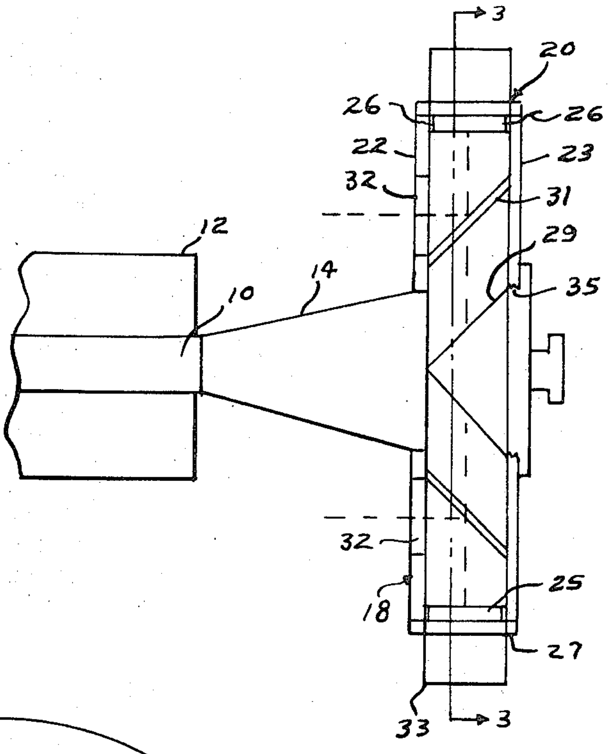
FIG. 2 is an enlarged view of the light emitting diode pumping attachment for the device of FIG. 1.
Figure 3:
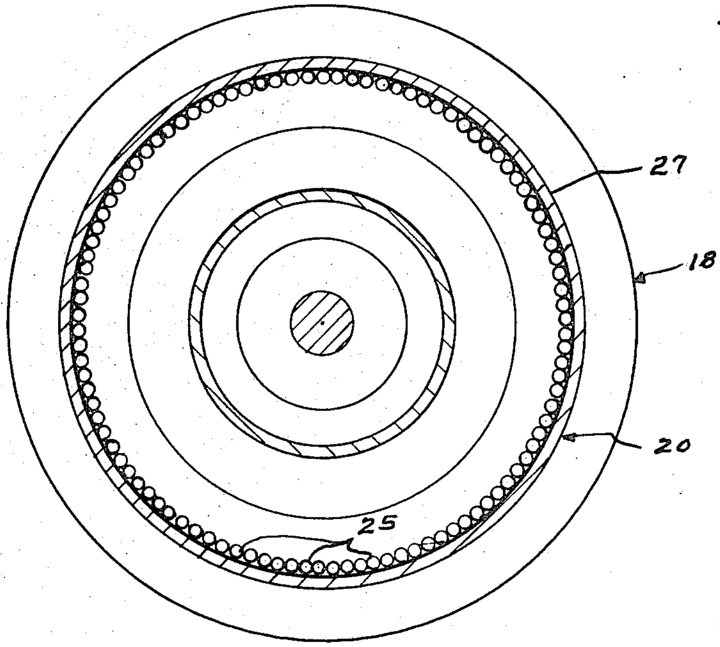
FIG. 3 is a sectional view of the device of FIG. 2 along the line 3—3.

The pumping attachment 18, shown in greater detail in FIGS. 2 and 3, has a circular housing 20 with side walls 22 and 23. A plurality of light emitting diodes 25 are positioned along the inner surface of wall 27. The diodes are energized through leads 26. Light from diodes 25 is directed into the cone 14 by means of a removable conical reflector 29. Undesired wave lengths of light from diodes 25 are removed by means of a dichroic filter 31. The unwanted light can pass out through windows 32. The diodes are cooled by a cooling device 33 which may be space radiators, heat pipe coolers, thermoelectric coolers or other cooling means depending upon the particular use of the apparatus.

For illumination with solar energy, the reflector cone may be threaded at 35 so that it can be removed by hand to permit solar energy to enter light concentrating cone 14. If the use of the apparatus is such, for example, in space where the reflector cone cannot be removed by hand, the cone may be made so that it can be removed by means of a servo control system.

In the operation of the device in normal sun pumped operation, light is collected with the solar collection optical system 16 and directed into the laser through the light concentrating cone 14 in the usual manner. When solar energy is not available, reflecting cone 29 is positioned to direct light from diodes 25 into the concentrating cone 14 to pump the laser 10. Undesired wave lengths are filtered by filter element 31.

The housing 20 need not be circular but can take other shapes. Also, the reflector 29 need not be conical but may take other shapes, for example, the housing could be square with the reflector having a pyramid shape or the reflector could be shaped to bring the light to a focus at some point in cone 14. Also, the reflector could have a fluted shape.

While light emitting diodes are described as the light source, other means could be used, for example, arc lamps.

There is thus provided a light emitting diode pumping attachment for a sun pumped laser which increases the packing efficiency for light emitting diode pumping of a laser and which simplifies the cooling problem for the laser and the light emitting diodes.

I claim:

1. An auxiliary light apparatus for a sun end pumped laser including, a laser, a cooling apparatus surrounding the laser and a light concentrating cone having its end connected to the end of said laser and its larger end extending away from said laser end and an optical solar energy collecting system adapted to direct solar energy into said light concentrating cone, comprising; a housing attached to the larger end of the light concentrating cone; said housing having a cross sectional area, perpendicular to the axis of the light concentrating cone, which is greater than the area of the larger end of said cone; a plurality of light emitting diodes in said housing positioned around and spaced from the periphery of said cone, means within said housing for directing light from the light emitting diodes into said light concentrating cone; said light directing means being adapted to be removed to permit solar energy from the solar energy collecting system to be directed into the light concentrating cone; means within said housing between the light emitting diodes and the light directing means for removing unwanted wave lengths of light from the light directed into the light concentrating cone.

2. The device as recited in claim 1 wherein the light emitting diodes are arrange in a circular array within said housing; said light directing means being a light reflecting cone positioned adjacent the light concentrating cone.

* * * * *